Sept. 9, 1941.   G. RIEPER   2,255,188

MEASURING INSTRUMENT FOR AIRCRAFT

Filed Dec. 20, 1938

INVENTOR.
Gerhard Rieper
BY Stephen Cerstvik
ATTORNEY.

Patented Sept. 9, 1941

2,255,188

UNITED STATES PATENT OFFICE 2,255,188

MEASURING INSTRUMENT FOR AIRCRAFT

Gerhard Rieper, Berlin-Lichterfelde, Germany, assignor to Siemens Apparate und Maschinen Gesellschaft mit beschränkter Haftung, Berlin, Germany, a corporation of Germany Application December 20, 1938, Serial No. 246,889
In Germany February 3, 1938

1 Claim. (Cl. 116—129)

This invention relates to measuring apparatus and more particularly to measuring and indicating instruments for aircraft.

One of the objects of the present invention is to provide novel means for giving a quickly readable quantitative indication of a measured quantity.

Another object is to provide novel means for indicating the magnitude of a quantity without the use of written characters.

A further object is to provide a compact indicating means which is easily readable in the dark.

The above and further objects and novel features will more fully appear from the following detailed description when the same is read in connection with the accompanying drawing. It is to be expressly understood, however, that the drawing is for purposes of illustration only and is not intended as a definition of the limits of the invention, reference for this latter purpose being had to the appended claim.

In the drawing, wherein like reference characters refer to like parts throughout the several views, Fig. 1 is a side elevation, partly in section, of one embodiment of the invention, the section being taken on line I—I of Fig. 2;

The form of the invention illustrated in the accompanying drawing, by way of example, is a device especially adapted for use as an indicating instrument for the dashboard of an aircraft where it is desirable that the pilot be able to obtain by a glance a quantitative indication of, for example, the amount of fuel or oil in one or more tanks without having to read numerals or other characters. The apparatus comprises two preferably circular discs which are mounted co-axially and adapted for movement relative to one another. In a zero position, one of the discs is completely covered by the other; however, means, which are controlled by the quantity to be measured, are operatively connected to one of the discs to rotate the same with respect to the other, in such a manner that, due to the rotation, a part of one of the discs is exposed, the exposed area being a function of the measured quantity and in the shape preferably of a sector of a circle.

Figure 1:
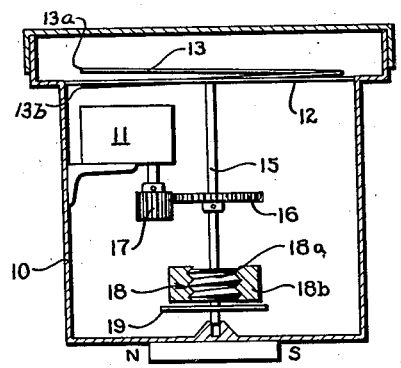
Figure 2:
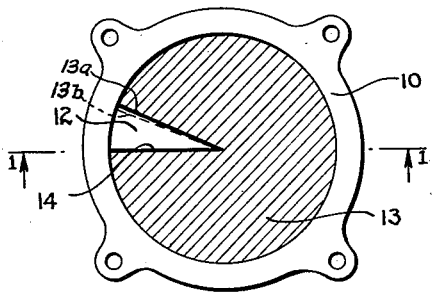
Fig. 2 is a top plan view of the embodiment of Fig. 1.
Figure 3:
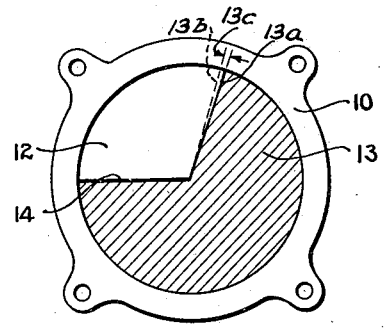
Fig. 3 is a view of the parts shown in Fig. 2 in a different operating position.

In the form shown in Fig. 1, the novel apparatus comprises an instrument housing 10 having therein a suitable measuring mechanism 11 which is governed by the quantity to be measured. Operatively connected to the measuring mechanism is the novel indicator comprising two circular discs 12 and 13. Disc 12 comprises a plane surface having a radial slot 14 therein, the edges of which are parallel but axially displaced from one another by a small amount sufficient to permit the passage of the disc 13 which comprises a helix and is co-axially mounted with disc 12. When observed in a horizontal plane the upper edge 13a of helical disc 13 forms a radial slot 13c with its lower edge 13b similar to the radial slot 14 of disc 12. The pitch of the helix is small and preferably approximates the thickness of the disc 12. The latter, in the embodiment illustrated, is fixedly mounted upon the housing 10 by suitable means (not shown). Disc 13 is centrally attached to a shaft 15 which by means of a gear 16 mounted thereon in mesh with another gear 17 is in the above-mentioned operative connection with the measuring mechanism 11.

In order to insure a proper axial displacement of disc 13 when the same is rotated, a suitable screw thread guide 18 is provided adjacent one extremity of shaft 15 comprising a screw portion 18a engaging a bore 18b mounted upon the housing 10. The pitch of the guide preferably equals that of the helix 13.

It is desirable to damp the movements of the angularly shiftable disc 13. Suitable damping means are therefore provided and attached to shaft 15 comprising, for example, an eddy current damper 19.

In order to enable a rapid reading of the indicator, the two discs are painted different colors. For example, disc 12 is preferably white or painted with a luminous substance, whereas disc 13 is black or dark.

In operation, the radial slot 14 of disc 12 preferably indicates the zero position. In the zero position, disc 13 completely covers disc 12. As the measuring mechanism 11 moves shaft 15, the disc 13 is angularly shifted whereby the lower edge 13b thereof passes through the radial slot 14 under disc 12, thus exposing a sector of disc 12, the sector being of a progressively changing area. Screw thread guide 18 axially shifts disc 13 to prevent frictional contact with the disc 12.

The exposed area is thus an indication of the magnitude of the measured quantity.

Instead of rotating disc 13, it is possible to reverse the process and angularly shift the plane disc 12, holding the former disc stationary. It would be necessary under such conditions to mount disc 12 upon shaft 15 in order that the former may be axially shifted a proper amount when in operation.

The helical disc may also be mounted so as to be axially non-displaceable, but at the same time rotatable, in which event the non-rotatable disc must be axially displaceable and guided by a suitable screw-thread guide, for example, analogous to the guide 18 above described.

Figure 4:
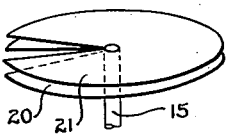
Fig. 4 is a perspective view of a second embodiment of the invention.

A second embodiment of the invention is illustrated in Fig. 4, wherein there are employed two helical discs 20, 21, each having the same pitch, which is preferably small. One of said discs is fixed to the housing 10 by suitable supports (not shown), while the other is rotatably mounted upon the shaft 15, the axial displacement of which is controlled by a suitable screw-thread guide (not shown) analogous to that shown in Fig. 1.

Figure 5:
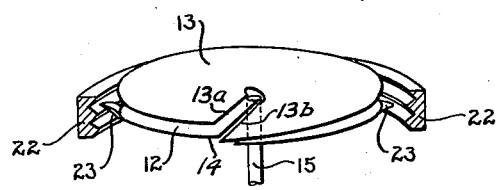
Fig. 5 is a perspective view with parts broken away of a third embodiment of the invention.

A third embodiment is shown in Fig. 5 which is analogous to the first embodiment with the exceptions that a different screw thread guide is provided and the helical surface 13 is fixed instead of the plane surface. Disc 13 is secured by suitable means (not shown) to the housing 10 or to some suitable support. The plane disc 12 is operatively connected to the shaft 15. Instead of employing a screw-thread guide comprising a threaded member 18a upon shaft 15 to axially displace the angularly shiftable disc 12, there is here employed a ring 22 having a threaded inner surface, which surrounds said discs and which is engaged by fingers 23 which are attached to the movable disc, thus making the same axially displaceable to permit motion relative to disc 13 without frictional contact therewith.

The operation of this embodiment is similar to that of the first with the exception that the plane disc is angularly shifted instead of the helical disc, the plane disc being axially displaced by the action of fingers 23 in the grooves of the threaded ring 22.

There is thus provided a novel indicating instrument which is especially adapted for use aboard aircraft where a multitude of gauges, measuring instruments and indicators are located upon the dashboard. Of this multitude of instruments, it is not necessary that the pilot know every fraction of the readings of every instrument, but rather it is necessary that he be able to determine with a glance the general operating condition of the craft. By providing an indicator having an easily read exposed dial portion which is proportional in area to the measured quantity, the above general operating condition is quickly determinable. The device is light in weight, simple in construction, and rugged.

Although only three embodiments of the invention have been illustrated and described in detail, it is to be expressly understood that the same is not limited thereto. For example, in the forms shown no dial graduations are illustrated; however, if necessary or desirable, suitable dial graduations may be placed upon the discs. Various changes may also be made in the design and arrangement of the parts without departing from the spirit and scope of the invention as the same will now be understood by those skilled in the art. For a definition of the limits of the invention, reference will be had primarily to the appended claim.

What is claimed is:

A measuring and indicating instrument comprising means responsive to changes in the magnitude of the quantity being measured, indicating means comprising a disc having a radial slot therein, a screw-threaded guide having a shaft coaxial with said disc, a helix mounted upon said shaft adjacent said disc, and means connecting said change responsive means to said shaft for actuating said helix to move it through the radial slot in said disc to form an indicating area which increases or decreases in size in proportion to an increase or decrease of the quantity being measured.

GERHARD RIEPER.